United States Patent
Patel et al.

(10) Patent No.: US 10,423,691 B1
(45) Date of Patent: Sep. 24, 2019

(54) RULE AND FILTER-BASED DEEPLINKING BETWEEN APPLICATIONS

(71) Applicant: Amazon Technologies, Inc., Reno, NV (US)

(72) Inventors: Tilakkumar Patel, Redmond, WA (US); Alexander Slutsker, Seattle, WA (US); Andrew Dennis Willingham, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 457 days.

(21) Appl. No.: 14/658,766

(22) Filed: Mar. 16, 2015

(51) Int. Cl.
    *G06F 17/00* (2019.01)
    *G06F 17/21* (2006.01)
    *G06F 17/22* (2006.01)
    *G06F 16/958* (2019.01)

(52) U.S. Cl.
    CPC ........ *G06F 16/958* (2019.01); *G06F 17/2235* (2013.01)

(58) Field of Classification Search
    CPC .......... G06F 17/30867; G06F 17/3053; G06F 17/30386; G06F 17/3097
    See application file for complete search history.

(56) References Cited

U.S. PATENT DOCUMENTS

| | | | |
|---|---|---|---|
| 2014/0019958 A1* | 1/2014 | Sherman | G06F 8/61 717/178 |
| 2014/0052683 A1* | 2/2014 | Kirkham | G06F 8/61 706/46 |
| 2014/0201350 A1* | 7/2014 | Lakes | G06F 17/30887 709/223 |
| 2014/0359519 A1* | 12/2014 | Luu | G06F 17/30991 715/780 |
| 2015/0227588 A1* | 8/2015 | Shapira | G06F 16/9535 707/722 |
| 2015/0242422 A1* | 8/2015 | Shapira | G06F 3/04842 707/722 |
| 2015/0347437 A1* | 12/2015 | Marti | G06F 17/3097 707/731 |
| 2016/0085521 A1* | 3/2016 | Savliwala | G06F 3/0482 717/108 |
| 2016/0125080 A1* | 5/2016 | Glover | G06F 16/951 707/706 |

* cited by examiner

*Primary Examiner* — Ariel Mercado
(74) *Attorney, Agent, or Firm* — Hogan Lovells US LLP

(57) ABSTRACT

A user accessing content via a Web browser or other application can be provided with an option to deep link (or automatically redirected) into an identified application in order to access corresponding content via the identified application. The deep link can be determined using a set of rules and filters to ensure that the appropriate link is determined and that the option to deep link is only provided in accordance with user preferences and behaviors, or any restrictions on the display of the content. If the identified application is not installed on the device, the user can be automatically redirected to an application store or other source from which the application can be obtained.

20 Claims, 7 Drawing Sheets

RULE AND FILTER-BASED DEEPLINKING BETWEEN APPLICATIONS

BACKGROUND

As people are increasingly utilizing portable computing devices, such as smart phones and tablets, to perform a variety of tasks, there is a need to improve the interfaces and capabilities provided by these and other such devices. For example, users are increasingly utilizing various applications to access content. A user might view content in a Web browser, for example, and might have another application installed that might be able to provide additional functionality with respect to that content. For example, a user might view information about a product on a website of an electronic marketplace and might be able to open a page of information on an application provided by the electronic marketplace to perform tasks or obtain information that is tailored specifically for mobile devices, and thus may provide enhanced performance and functionality. It can be difficult, however, to maneuver easily between the applications. For example, a page of search results on the Web would require the user to type in and run the same query in the application to obtain the page of search results in the application. Similarly, a page of content about a product generally would require the user to determine and utilize the appropriate name of the product in order to be able to be able to locate information for that product in the other application. Even for content that provides linking between applications, these typically are based on coded links or mappings and do not rely upon logic or rules to determine which link to provide. There is currently no way to easily and intelligently enable deep linking between such applications. Further, for many existing solutions the customer experience can be clunky and unreliable, and can work differently upon different attempts to use those solutions.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to mapping and/or linking content between different applications. In particular, various embodiments utilize rules and filters to provide for intelligent deep linking of content between applications, including determinations as to whether the linked content should be displayed.

In various embodiments, a user might access content through a first application, such as a Web browser, email client, or other such application, installed on a device such as a mobile device. The user might also be able to access that content using a dedicated application that provides additional and/or tailored functionality relating to that content. In order to enable the user to easily access the content through the dedicated application, a deep link can be determined that causes the application to be opened to the corresponding page, location, or interface including that content. In many cases, different applications will use different linking schema, for example, such that a link in one application cannot necessarily be directly translated to another application. The deep link can instead be determined by obtaining information from the first page, such as from the URL, metadata, or content description, and processing that information using a set of rules to find a rule that matches the information. The rule can determine an application page, for example, that includes matching content per the rule. In order to determine whether this page should be displayed for this user and/or device, however, the information can also be processed using one or more filters. The filters can determine, for example, whether this type of content is to be displayed to a particular user or on a particular type of device. Unless a filter restricts the display, for example, the location of a matching rule can cause the deep link from the matching rule to be provided. The deep link can enable the corresponding content to be opened in the dedicated application. In some cases, a banner, message, or other notification (e.g., on-site or offsite advertisement, push notification, or SMS) can be provided that can enable the user to cause the deep link to be followed in order to access that content in the dedicated application. If the dedicated application is not installed on the device, the device can be caused to display or access an application store from which the application can be obtained. If the user does not cause the application to be obtained, or if no match is found that is not filtered, then no deep link may be provided. If a user selects an option not to received deep link suggestions, the deep link might also not be provided.

Various other applications, processes and uses are presented below with respect to the various embodiments.

Figure 1:
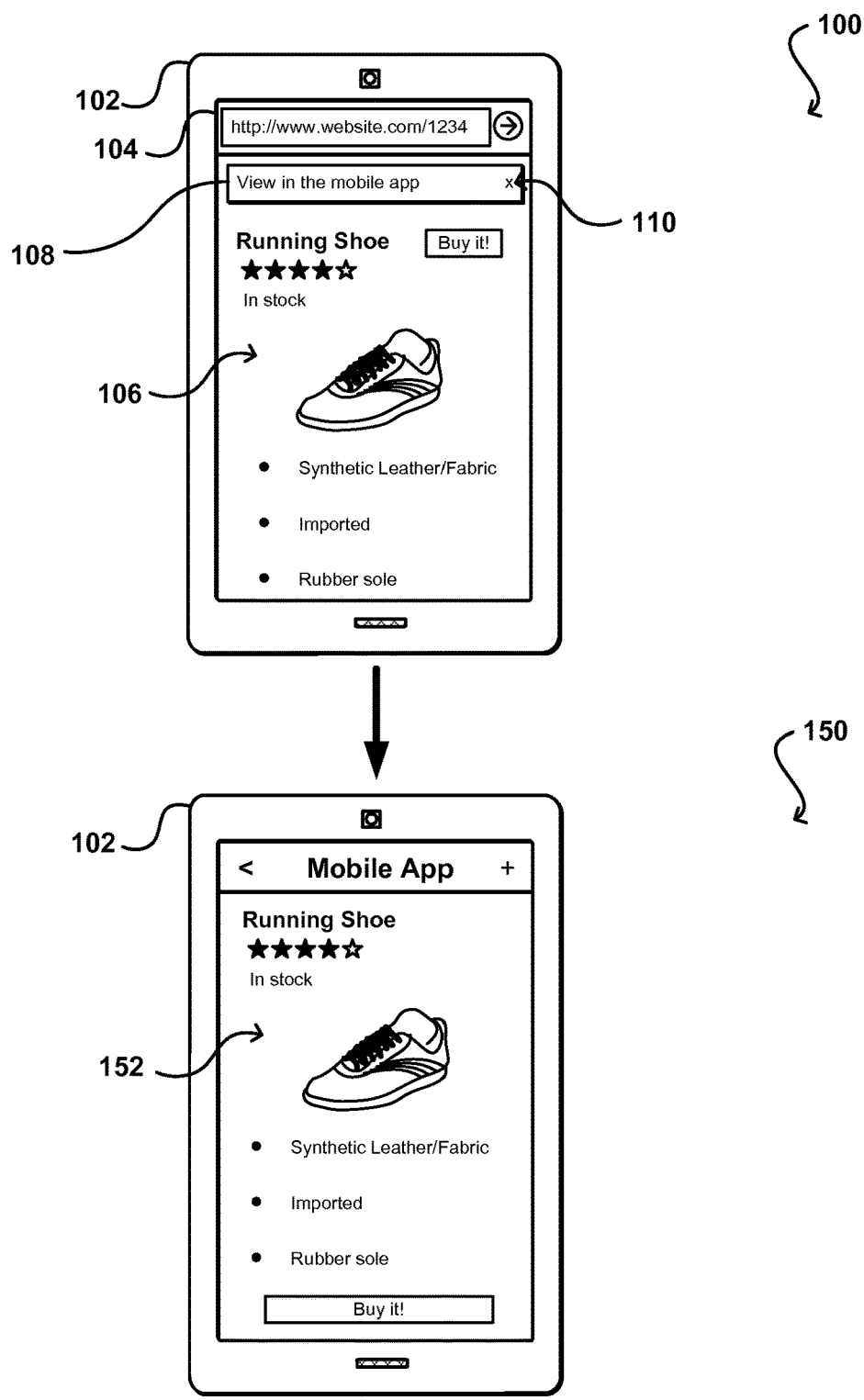
FIG. 1 illustrates an example situation in which a user is able to view similar content in two different applications executing on an electronic device that can be utilized in accordance with various embodiments.

FIG. 1 illustrates an example situation 100 wherein content is being accessed using a first application executing on a computing device 102. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the content is being accessed using a webpage displayed in a Web browser executing on the computing device 102. This content shall be referred to as "Web content" herein for purposes of distinction, as this content in at least some embodiments is provided in an Internet-appropriate format, such as may rely upon an Internet protocol or hypertext markup language, for display in an application such as a Web browser. "Web" content thus can refer to content to be delivered over a network, such as the Internet, that can be displayed or otherwise presented in a general purpose browser application, such as a Web browser. Content may be provided in various forms, formats, or versions for different types of presentation, and a Web content version may be provided that is appropriate for general purpose browser applications. As known for webpages, content 106 is displayed that is determined using an address such as a uniform resource locator (URL) 104. In this example, the content corresponds to a shoe available from an electronic marketplace. In this case, the electronic marketplace provider also offers a mobile application (or "app") that can also display content for that shoe. The mobile application is tailored for the mobile environment, and in many cases can provide additional or enhanced functionality, such as one-click ordering or the ability to bookmark that content, that might not be offered through the webpage, even if that page is customized for mobile devices. The mobile application can be configured to display or present a different version of the content, such as may be referred to as mobile "application content" or "dedicated content." Since the application can provide specific functionality and features, the mobile application content can be tailored to be presented via that application rather than forced to allow for a variety of functions and features as may be present from various devices through any of a set of general purpose browser applications.

In order to enable the user to easily access the content in the dedicated mobile application, the webpage can provide a banner 108 or other notification that can be selected by a user, for example, in order to cause corresponding content 152 for that item to be displayed in the mobile application, as illustrated in the example situation 150 of FIG. 1. By selecting such an option, a "deep link" corresponding to that content can cause the appropriate content to be displayed in the mobile application, which can include launching the application if needed. A "deep link" as used herein refers to a link (or other navigational element or data) to a specific page, location, or interface of an application, for example. The ability to utilize a deep link enables a user to access the desired content in a different application without the need for the user to manually locate the content in the other application, which can be difficult if the user does not know the name of the product, or at least cumbersome if the page requires the user to re-enter a query or other text in the mobile application, navigate to a certain page, etc. If the user is not interested in viewing the corresponding content in a dedicated mobile application, the user can ignore the banner 108 or in some cases can select an option 110 to close or exit the banner, which can cause the banner to no longer be displayed. As discussed later herein, the selection of such an option can also cause fewer banner ads to be displayed to the user, at least for a period of time or type of content, etc. Various other interfaces can utilize such options as well, including interfaces such as interstitial pages, pop-up messages, modal windows, and the like. Options also can vary based upon information such as user location, user type, installed applications, type of computing device, target destination, time spent viewing content, browse category, user actions, etc.

Figure 2:
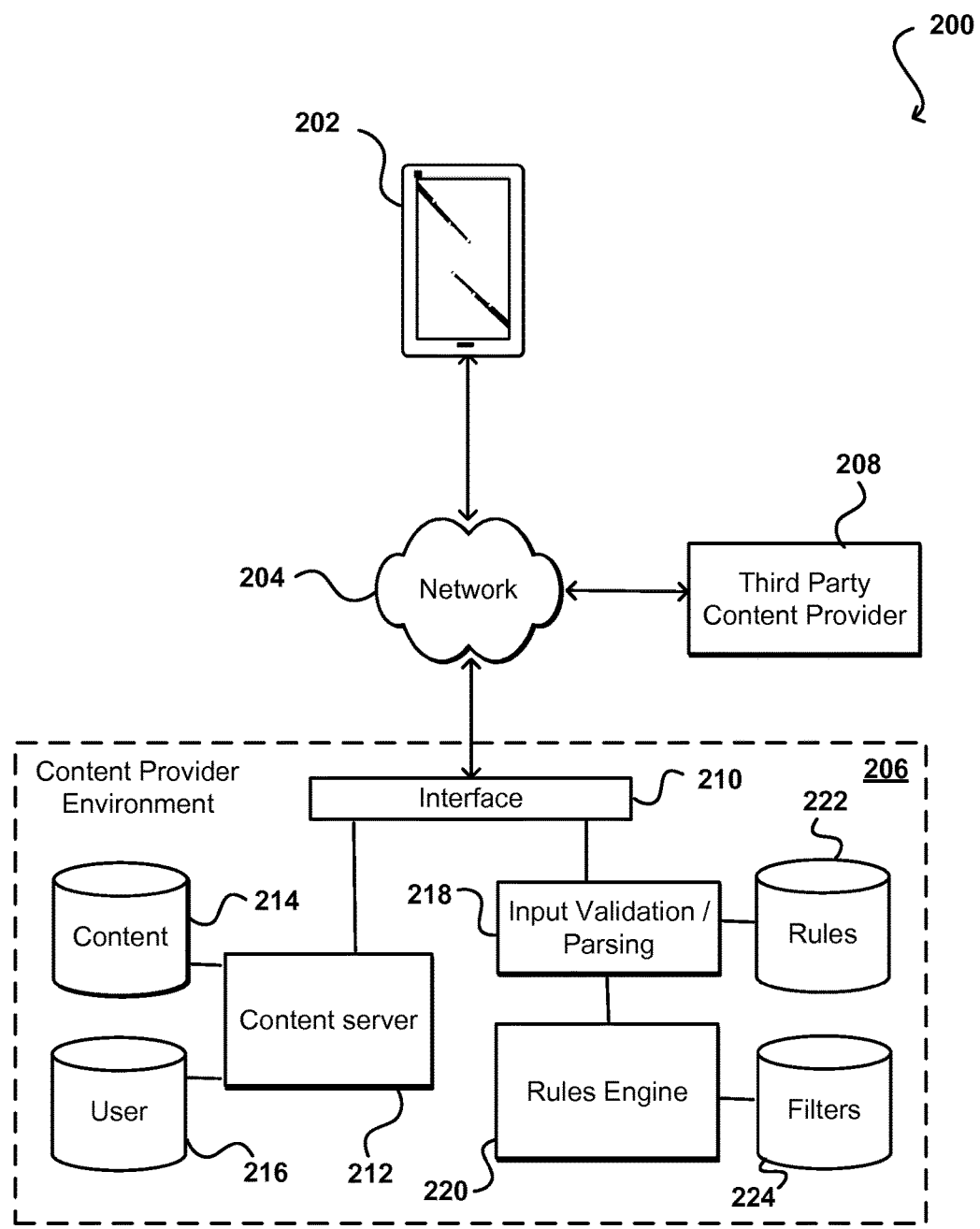
FIG. 2 illustrates an example environment in which deep links can be provided for applications that can be utilized in accordance with various embodiments.

FIG. 2 illustrates an example environment 200 that can be used to determine and provide the appropriate deep link for an application. In this example, a computing device 202 is able to make a call or request across one or more networks 204 to a content provider environment 206. The network(s) can include any appropriate network, such as the Internet, a local area network (LAN), a cellular network, an Ethernet, or other such wired and/or wireless network. The content provider environment 206 can include any appropriate resources for providing content from a resource provider, as may include various servers, data stores, and other such components known or used for providing content from across a network (or from the "cloud").

In this example, a call received to the resource provider environment 206 can be received by an interface layer 210 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content servers 212, which can obtain the content from a content data store 214 or other such repository to be sent back across the network(s) to the computing device. In some embodiments, information for the request might also be compared against user data in a user data store 216 or other such location do determine, for example, whether the user has access rights to that content.

If, instead, the request is attempting to determine a deep link, information for the request can be passed to a component such as an input validation and/or parsing module 218, which might be a standalone device or software executing on a server or other such component. The input validation and/or parsing module can analyze the information to attempt to determine the data to be used to determine the deep link. In some embodiments, this can include determining a data value or tag information from a URL that identifies the content of interest. For items in an electronic marketplace, this can be an item identifier. For search result pages, this can include the query used to obtain the results. Various other types of information can be utilized as well as discussed and suggested elsewhere herein.

Once the data is determined, that data can be analyzed using a rules engine 220 and a set of rules obtained from a rules data store 222 or other such location. In some embodiments, the data can be analyzed one rule at a time until a match is found. For example, one rule might apply for a certain type of item while another rule might apply for a different type of page, such as a search page or category page. If a matching rule is located, a set of filters can be obtained, such as from a filter data store 224, and used to determine whether any of the filters would prevent that content or link from being provided. For example, certain types of content may not be able to be displayed on certain types of devices, to certain users or types of users, or in certain locations. If any of the filters prevents that page or link from being provided, any additional rules can be analyzed by the rules engine 220 to attempt to determine a link that is not filtered using the set of filters. If such a link is located, the deep link can be provided to the computing device 202 in order to enable the device to locate and display the appropriate content in the corresponding application. If no matching rule can be located that is not filtered, then no link may be provided to enable such display. As should be understood, at least some of the content can alternatively, or additionally, be provided from a third party content provider 208 or other such source.

Figure 3:
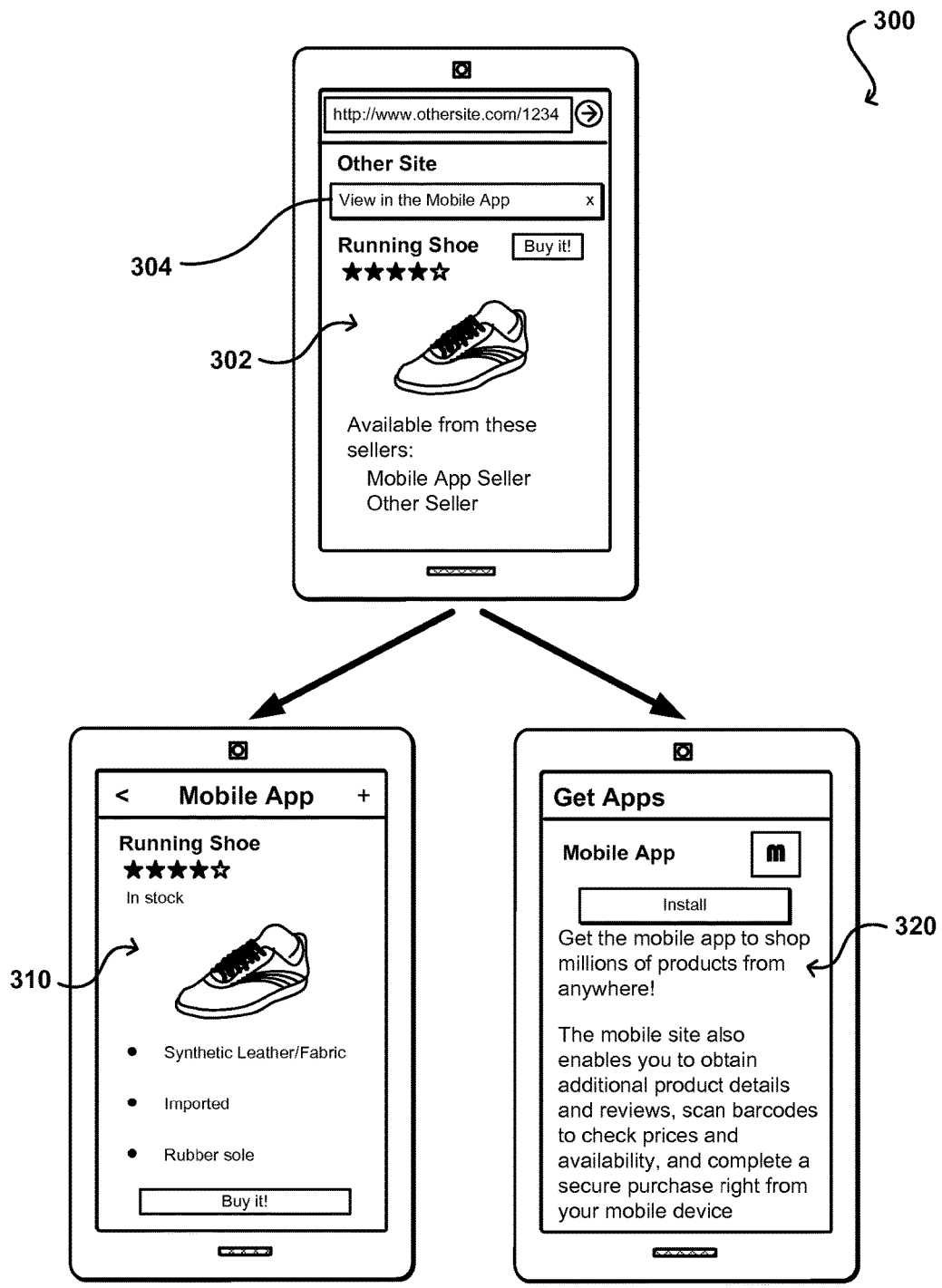
FIG. 3 illustrates an example situation wherein a device can be directed to obtain an application from an application store, if the device does not currently have an application installed corresponding to a deep link, that can be utilized in accordance with various embodiments.

In some situations, the computing device might not have a copy (or at least a current copy) of the application installed. In such cases, the computing device can be caused to display an application store or other such mechanism for obtaining the application. For example, in the situation 300 of FIG. 3 the user has selected a banner 304 that enables application content 310, corresponding to Web content 302 displayed through a Web browser application, to be displayed in the corresponding dedicated application. If the device is determined to not have the appropriate copy or version of the application installed, the process can cause the computing device to instead display an application store 320 or other such mechanism for obtaining the application. The user can then select to install (or not install) the application from the application store. Once the application is installed on the device, the application can be executed and, in at least some embodiments, the deep link can then be used to cause the dedicated application content 310 to be displayed via the dedicated application.

Figure 4:
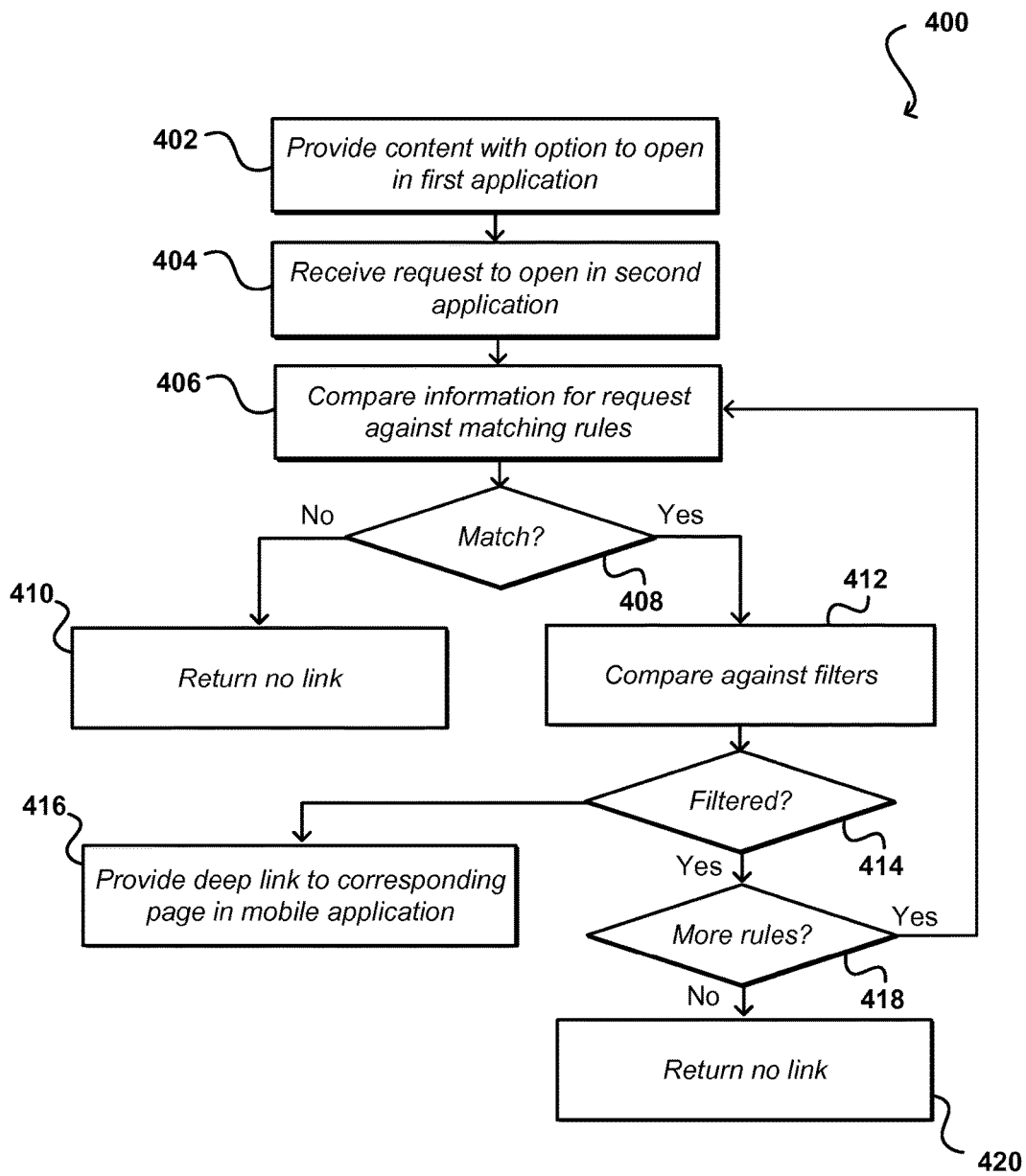
FIG. 4 illustrates an example process for providing a deep link to an application that can be utilized in accordance with various embodiments.

FIG. 4 illustrates an example process 400 for determining the appropriate deep link that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, content (such as Web content) is provided 402 for display through a first application (such as a browser application) on a computing device, where that content includes an option to open related content in a second application, such as a dedicated mobile application. It should be understood that other content can be provided for display as well, such as email or text content, etc. Further, while mobile applications are utilized for purposes of discussion, it should be understood that various other types of applications (or modules, processes, etc.) can be utilized as well within the scope of the various embodiments. As mentioned, the option can take the form of a user-selectable element or option, as may include one or more graphical elements. A request (or call or instruction, etc.) is received 404 to display the related content in the second application, herein the dedicated application. This can be received before the display of content, in order to determine whether to display a banner, interstitial, or other option to follow the link, or after selection of such an option in various embodiments.

In order to determine the appropriate deep link (or other address or location) for the corresponding content in the dedicated application, information can be extracted from the request (or otherwise obtained) that can be used to attempt to locate a match. The request can include data such as the URL for the current page, user session data, user agent data, the IP address, etc. As an example, a URL of the page being viewed can be parsed and/or analyzed to determine information (such as an item identifier, page identifier, query, or the like) that can be used to locate a match. The service can also use the data to determine information such as the type of device, user, etc. In at least some embodiments, the types of information to be used can depend at least in part upon the types of rules used and/or the type of initial content displayed. Once such information is located or otherwise identified, the information can be compared 406 against a set of matching rules (or other such matching guides or criteria). A determination can then be made 408 as to whether one of the rules matches the information. In at least some embodi-ments, the rules can be part of an ordered set that can be traversed from first to last (or in another appropriate way) until a match is located. Each rule can analyze one or more regular expressions for an input URL, for example. A match can be located, for example, when a type and/or value of the information matches one or more criteria in the rule. For example, a first rule might apply for item identifiers and a second rule might apply for search pages. Different rules might also apply for different types of item identifiers, or identifiers for different types of items. Various other rules and criteria can be used as well as should be apparent to one of ordinary skill in the art in light of the teachings and suggestions contained herein.

If all of the rules (or at least all of the relevant or identified rules) are compared against the information and no match is found, no deep link will be returned 410. In some embodiments a notification can be returned that no match was found, while in other embodiments the process might simply time out, among other such options. If a match is found, the matching process can pause so that the match can be compared 412 against a set of filters (if available). Each filter can itself act like a rule, except that these filters indicate where matches are not to be used to provide deep links. Each filter can also specify one or more criteria where the filter applies. For example, certain types of content might not be able to be displayed to certain types of users or on certain types of devices. A determination can thus be made 414, based at least in part upon one or more of the filters, as to whether the match should be filtered. If a match relates to content that is not to be displayed per one or more filters, a determination can be made 418 as to whether there are more rules to be compared against the information. In some embodiments, this determination could occur prior to the filtering. If so, the process continues by comparing the next rule against the information. If no more rules in the set remain to be processed, no deep link can be returned 420 as discussed previously. If a matching rule is found and no filters cause the match to be filtered, the deep link for the corresponding page or other location of the content in the dedicated mobile application can be provided 416 to cause that content to be displayed in the dedicated application if the application is executing or able to be executed on the device. The deep link data provided can include various types of information in some embodiments, as may include the determined link, the relevant application store identifier, any user preferences, information about the request, etc. Such information can enable the device and/or application to determine how/whether to utilize the link. Preferences can indicate, for example, to show or not show the deep link, do an automatic redirection if possible, etc. In some embodiments, automatic redirects can be performed based upon other information as well, such as an originating channel of the user or request, historical user data, original destinations, and the like.

As a general example, an input URL for a request might take the form of, for example:

example.com/foo/item/QWERTY/ ref=generic_device?ab_c=1234

The service might then return a deep link for the application that contains some of the same information, but using the appropriate schema for the intended application. As an example, the deep link might take the form of:

example.shopping://example.comlitems/ QWERTY?ref=generic_device?ab_c=1234.

In some embodiments, the deep link is determined before a banner is displayed. The deep link information returned then can include metadata specifying whether to show the banner, issue an automatic redirect, not show a banner, or perform another such operation.

Figure 5:
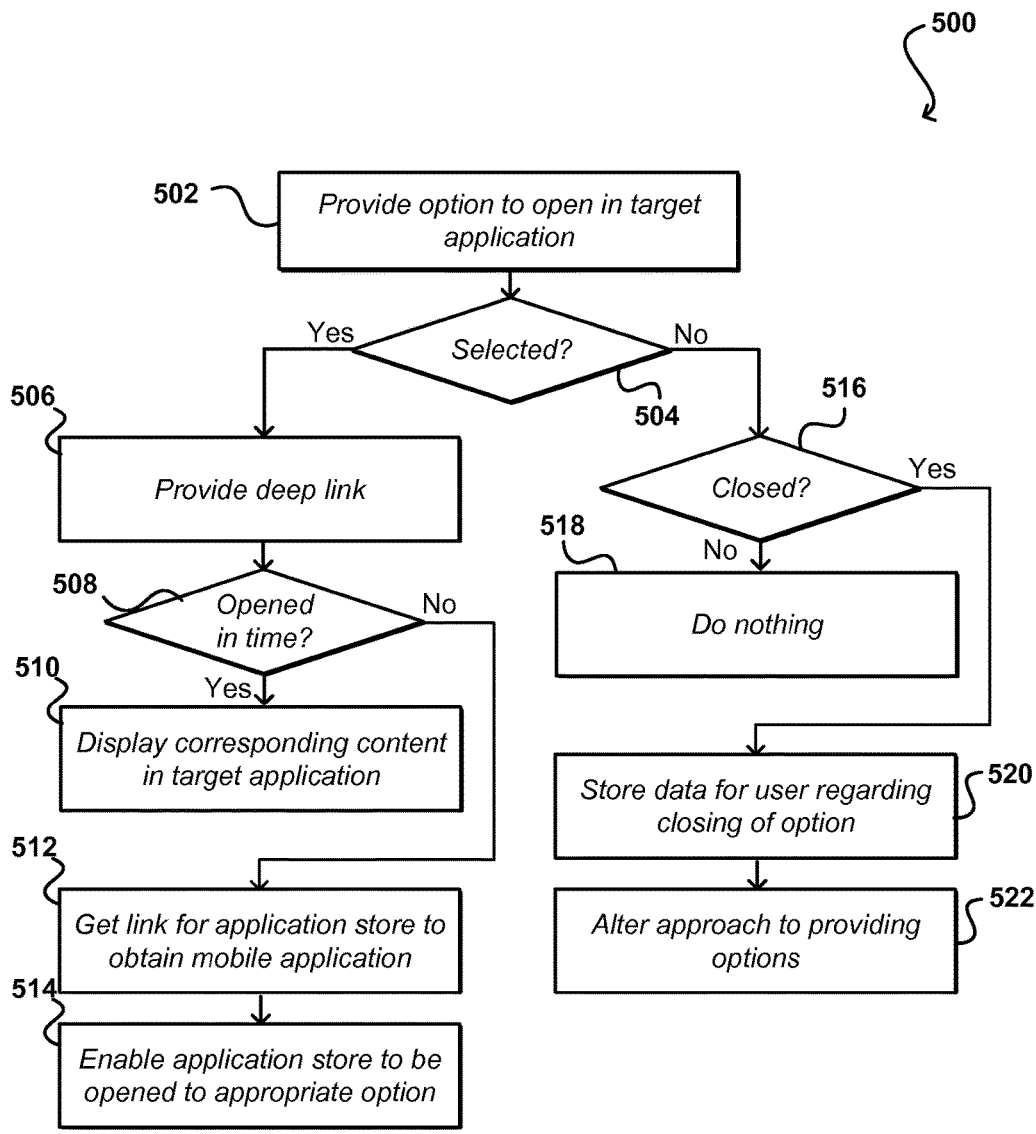
FIG. 5 illustrates an example process for obtaining an application for a deep link as needed to display the content for the deep link that can be utilized in accordance with various embodiments.

As mentioned, the action taken by the device in response to a deep link can depend in part on whether the appropriate version of the corresponding application is installed and can be executed on the device. Further, other actions taken with respect to the option to open the content in the dedicated application (or other identified application) can cause different actions to occur as well, as illustrated in the example process 500 of FIG. 5. In this example, an option to open content in a target (e.g., mobile or dedicated) application is provided 502, as discussed previously. A determination can be made 504 as to whether the option is selected by a user. If the option is selected, a deep link can be determined and provided 506 using a process such as that discussed with respect to FIG. 4. In some embodiments a website can execute JavaScript or similar code to attempt to open the application in an iframe, or other such mechanism. If the application is determined 508 to be opened (or is already open) within a determined period of time, the corresponding content can be displayed 510 in the target application. If the application is unable to be opened within a determined period of time, it can be determined or inferred that the application, or at least a specified or minimum version of the application, is not installed or properly accessible on the device. In such a situation, a link for application store can be determined 512 that can enable the user to obtain a copy of the application for installation on the device. The link can be determined based at least in part upon the type of device, the operating system of the device, an account of the user, installed store applications on the device, and/or other such information. If the link (or other identifier or locator) is able to be determined, the application store can be caused 514 to be opened on the device, which can enable the user to select to download or otherwise obtain or update the application in order to be able to view the corresponding content in the application.

If the option to display the content in the application is not selected, a determination can be made 516 as to whether the user selected to close, exit, or otherwise no longer display the option. This can include, for example, the user selecting a close icon on an option banner asking whether the user would like to view the content in the application. If not, the device can do nothing 518 and continue to display the content or otherwise perform actions as instructed. If the option is closed, however, data regarding the closure of the option can be stored 520 in a way that is associated with the user and/or device. Based at least in part upon the closure, as well as potentially other data such as other recent closures or user preferences, a determination can be made to adjust 522 the way in which such options are provided to the user in the future, such as to not provide option to that user or on that device for a least a minimum period of time, such as at least thirty days among other such options. The length of the period can be fixed or determined based upon information such as the number of closures, user preferences, device preferences, and the like. Other factors may be considered as well, such as the frequency of display of such options, the frequency of the options not being followed, etc.

In many instances, the mapping and deep link determination can be performed and/or provided as a service by a content provider who provides both the Web content and the dedicated application, or other types of associated content and/or applications for displaying that content. In other instances, the service might be provided by third party service to enable corresponding content to be opened, viewed, or otherwise accessed in differing applications (or application versions, etc.). The mappings themselves can be maintained in various tables, data stores, etc., as key value pairs or other such mappings, and can be generated using rules of the rules engine in at least some embodiments. In some cases the data stored may not include full deep links, but instead the necessary information to generate the appropriate deep link, such as the identifier used in one application or the other. For example, the mapped data might be used to fill in an appropriate URL schema for the type of device, application, etc. For search pages, the query itself might be preserved for tracking purposes. Other information can be maintained as well, such as information pertaining to a user's engagement with an application such that intelligent decisions can be made as to whether a user prefers to be deeplinked into a particular application. Each time a user deep links into an application, information can be passed to the service in order to track (where allowable by the user) the number or frequency of times the user selects to deep link, in order to make better decisions about when to recommend deep linking to that user in the future. For example, a user who frequently deep links might get an option on almost every page on the Web, while users who frequently close the option might get relatively few options or, after a period of time or number of closures, might receive no additional deep linking options. If the user always (or with sufficient frequency) selects to deep link, the user can automatically be deep linked into the application in some embodiments.

In at least some embodiments, a console or interface can be provided that can enable a provider (or other appropriate user or entity) to add, update, and/or delete, rules or filters, or adjust the ordering of one or more rules, to be used with the deep linking service. For example, a user can indicate a regular expression that is to map to a specific deep link in an identified application. The user can also identify any filters to apply for that rule, whether by selecting from a list or creating/providing a new filter, among other such options. The ordering of the rules can also be important, as there can be conflicting rules and the ordering should selected in order to indicate which rule should take precedence, as the rules are evaluated in order. For example, a general rule might state that any product content should be opened in a first application. If a second rule instead specified that a certain type of product content should instead be opened in a second application, the second rule would need to be ordered before the general rule in order to have that rule match first and cause the content of that type to be opened in the second application, as otherwise the general rule would cause that content to be opened in the first application. Filters also can be used that modify a portion of the deep link in order to cause related (but different) content to be displayed in a particular application, on a particular type of device, etc.

Such a service can also be used to determine how to provide certain content to a user. For example, a user might view an email message that includes a link to information about a product. Selection of the link might cause the user to be taken to an "email redirector" page, which can be a blank page or page with a short message that can call the deep linking service to see whether the service will return a deep link. If a deep link is returned, the relevant content can be opened in the dedicated application. If a deep link is not returned, that content can instead be displayed via a webpage opened in a browser application, among other such options.

Figure 6:
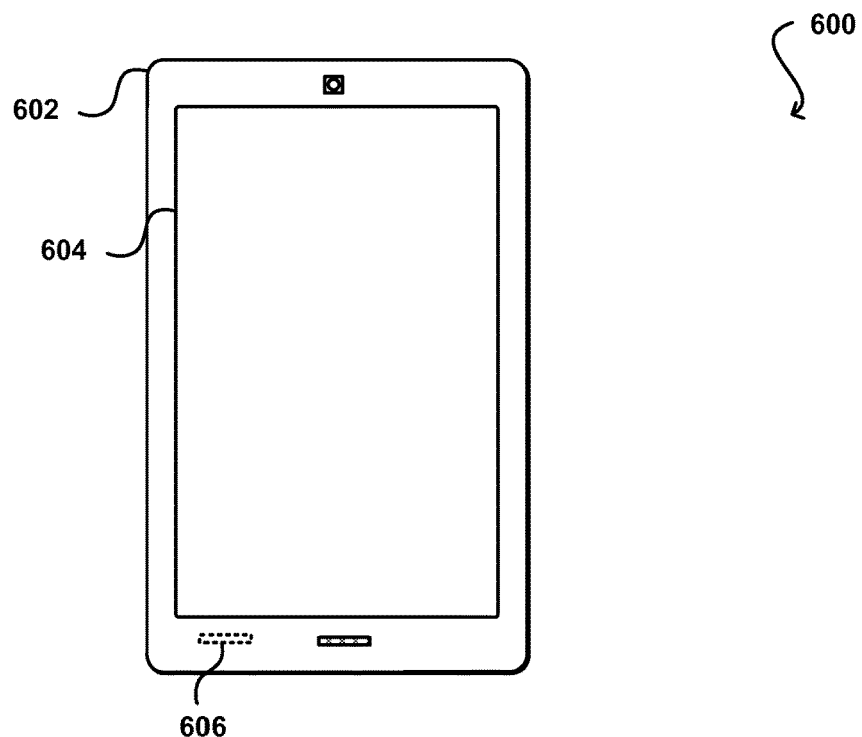
FIG. 6 illustrates an example computing device that can be used in accordance with various embodiments.

FIG. 6 illustrates an example computing device 600 that can be used in accordance with various embodiments.

Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 7:
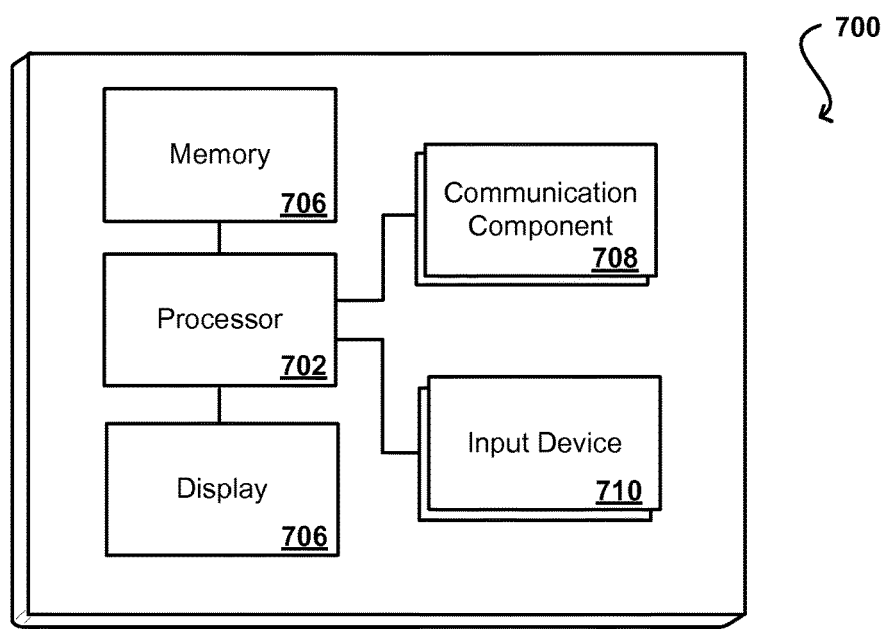
FIG. 7 illustrates example components of a computing device such as that illustrated in FIG. 6.

In this example, the computing device 600 has a display screen 602, which under normal operation will display information to a user (or viewer) facing the display screen (e.g., on the same side of the computing device as the display screen). As discussed herein, the device can include one or more communication components 604, such as may include a cellular communications subsystem, Wi-Fi communications subsystem, BLUETOOTH® communication subsystem, and the like. FIG. 7 illustrates a set of basic components of a computing device 700 such as the device 600 described with respect to FIG. 6. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device typically will include at least one type of display element 706, such as a touch screen, electronic ink (e-ink), organic light emitting diode (OLED) or liquid crystal display (LCD), although devices such as portable media players might convey information via other means, such as through audio speakers. The device can include at least one communication component 708, as may enabled wired and/or wireless communication of voice and/or data signals, for example, over a network such as the Internet, a cellular network, a Wi-Fi network, BLUETOOTH®, and the like. The device can include at least one additional input device 1312 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
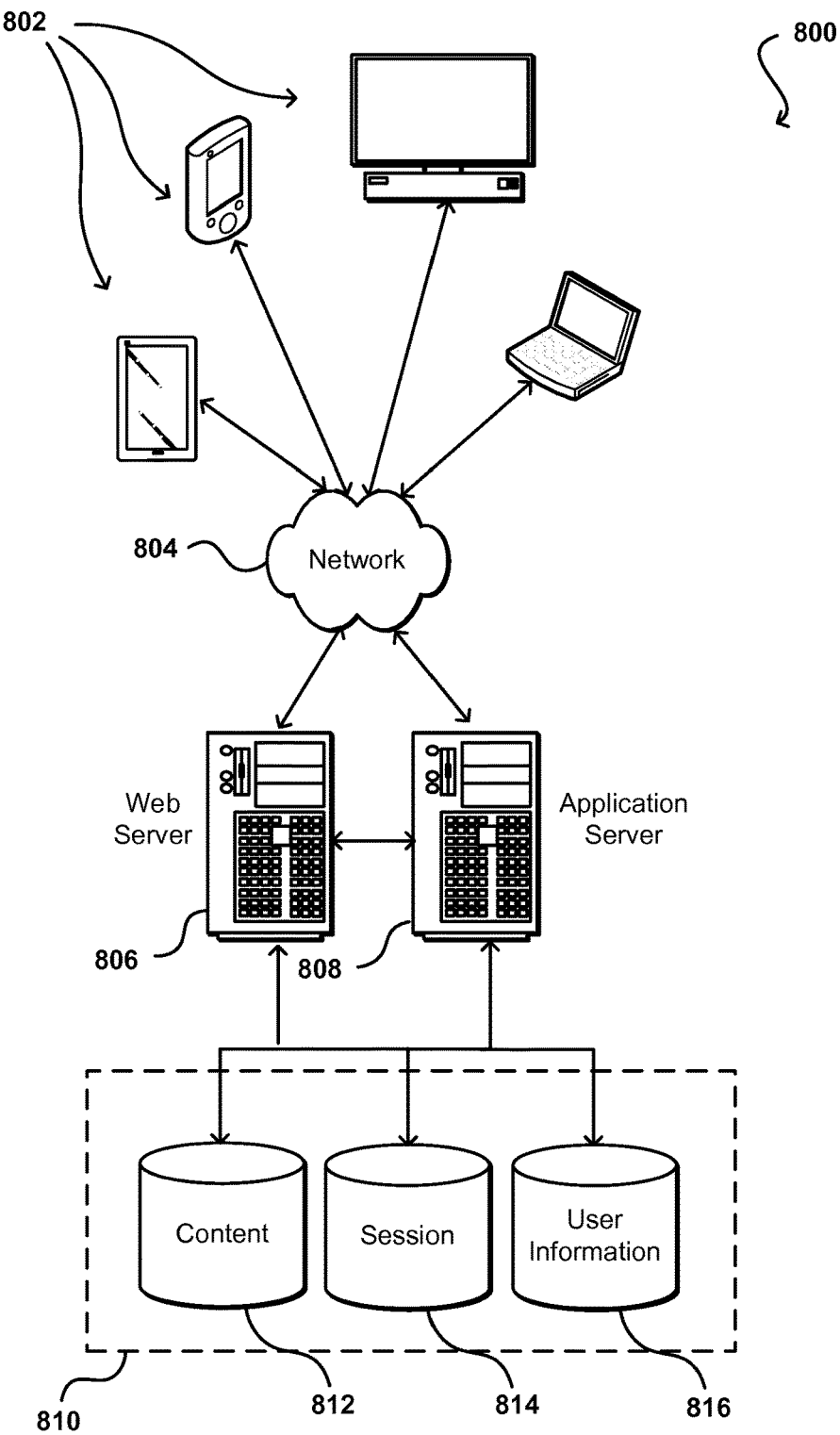
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle, Microsoft, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one processor; and
   memory including instructions that, when executed by the at least one processor, cause the computing system to:
   receive, from a mobile device, a request for mobile Web content to be displayed using a Web browser on the mobile device, wherein the request includes a Uniform Resource Locator (URL) of a webpage;
   determine, from the request and using the at least one processor, at least one of an item identifier, a page identifier, or a query associated with the URL;
   compare, in a predetermined order, the at least one of the item identifier, the page identifier, or the query associated with the URL against an ordered set of matching rules each until an applicable matching rule is located, the applicable matching rule generating a deep link using at least a portion of the URL, the deep link specifying a location of mobile application content corresponding to the mobile Web content, the mobile application content configured to be displayed via a specified mobile application;
   determine, using a set of display-restricting filters employing criteria based on the at least one of the item identifier, the page identifier, or the query associated with the URL and at least one of a device, user, location, or content type, that the deep link is provided to the mobile device, wherein at least one filter of the set of filters includes one or more of the criteria for determining display of the mobile application content;
   apply at least one additional matching rule to the at least one of the item identifier, the page identifier, or the query associated with the URL after the mobile application content on the mobile device is restricted from being displayed;
   determine, based at least in part upon user preference data, that an option to follow the deep link is to be provided to the mobile device; and
   provide, to the mobile device, link data including at least the deep link and information regarding the determination to provide the option,
   wherein the option may be selected via the mobile device to cause the mobile application content to be displayed using the specified mobile application on the mobile device.

2. The computing system of claim 1, wherein
   the instructions when executed further cause the computing system to:
   receive, from the mobile device, a second request for second mobile Web content to be displayed using the Web browser on the mobile device;
   determine that a second deep link corresponding to the second mobile Web content is not able to be provided to the mobile device according to at least one filter of the set of restricting filters; and
   reject the applicable matching rule, wherein any remaining rules in the ordered set of rules are compared, in order, against the at least one of the item identifier, the page identifier, or the query associated with the URL to attempt to locate a new applicable matching rule.

3. The computing system of claim 1, wherein the instructions when executed further cause the computing system to:
   receive, from the mobile device, a second request for second mobile Web content to be displayed using the Web browser on the mobile device;
   determine that an automatic redirect is to be performed using the deep link and the specified mobile application; and
   provide, to the mobile device, link data including at least the deep link and information regarding the determination to perform the automatic redirect on the mobile device.

4. The computing system of claim 1, wherein the instructions when executed further cause the computing system to:
   determine the installation status of the specified mobile application on the mobile device,
   and cause the mobile device to perform an automatic redirect to an application store, wherein the application store enables a copy of the specified mobile application to be obtained for the mobile device, after determining that the specified mobile application is not installed on the mobile device.

5. A computer-implemented method, comprising:
   determining at least one of an item identifier, a page identifier, or a query associated with a Uniform Resource Locator (URL) from a first application on a computing device, the computing device including one or more processors, the first application being one of a plurality of applications which display a first content;
   determining, using the one or more device processors, corresponding second content-for display in a second application on the computing device based upon the at least one of the item identifier, the page identifier, or the query associated with the URL and one or more matching rules, the second content being configured for display via the second application;
   determining, using the one or more device processors, a link to the second content for display via the second application;
   determining, using the one or more device processors and a set of display-restricting filters employing criteria based on the at least one of the item identifier, the page identifier, or the query associated with the URL and at least one of a device, user, location, or content type, that the second content is restricted from being displayed on the computing device via the second application, wherein at least one additional matching rule is applied after the second content is restricted from being displayed on the computing device; and
   providing, to the computing device, the link to enable the second content to be displayed via the second application.

6. The computer-implemented method of claim 5, further comprising:
   determining that the second application is not installed on the computing device; and
   causing the computing device to redirect to an application store from which the second application can be obtained.

7. The computer-implemented method of claim 5, further comprising:
   determining, based at least in part upon at least one of user preference data or user behavior data, to automatically redirect the computing device to display the second content via the second application; and
   providing information regarding the redirect to the computing device with the link.

8. The computer-implemented method of claim 5, further comprising:
   comparing information for the first content to the set of matching rules; and determining an applicable matching rule from the set of rules, wherein the applicable matching rule is used to determine the second content.

9. The computer-implemented method of claim 8, wherein the set of matching rules is an ordered set, and further comprising:
comparing, per the order, each rule in the set of rules against the information for the first content until the applicable matching rule is located or every rule in the set is compared against the information.

10. The computer-implemented method of claim 8, further comprising:
analyzing each filter of the set of display-restricting filters to determine, for the applicable matching rule, whether the second content is restricted from being displayed on the computing device.

11. The computer-implemented method of claim 10, wherein the analyzing further includes analyzing information including at least one of a type of the computing device, a type of the user, an identity of the user, historical user data, preference data, location data, or a type of the content.

12. The computer-implemented method of claim 8, further comprising:
analyzing at least one of user history information or user preference information to determine whether to perform at least one of redirecting the computing device to display the second content via the second application or providing a user-selectable option to display the second content via the second application.

13. The computer-implemented method of claim 5, further comprising:
receiving an indication as to whether the link to the second content for the second application was selected or whether an option to follow the link was closed; and
storing information for the indication as historical user data for use in future determinations.

14. The computer-implemented method of claim 5, further comprising:
preventing an option to follow a subsequent link, to the second content to be displayed via the second application, from being displayed to a user of the computing device in response to user behavior with respect to at least one prior option to follow a determined link.

15. The computer-implemented method of claim 5, wherein the determining of the second content is further based on at least one of a portion of a uniform resource link for the content, user session data, user agent data, or an internet protocol (IP) address of the computing device.

16. A non-transitory computer-readable storage medium storing instructions that, when executed by at least one processor of a computing device, cause the computing device to:
determine at least one of an item identifier, a page identifier, or a query associated with a Uniform Resource Locator (URL) from a first application of a computing device, wherein a first content is displayed from the first application executable on the computing device;
determine a second content for display in a second application on the computing device based on the at least one of the item identifier, the page identifier, or the query associated with the URL and a set of matching rules;
determine a deep link to the second content for the second application;
determine, based on the at least one of the item identifier, the page identifier, or the query associated with the URL, that the second content is restricted from being displayed on the computing device via the second application, wherein at least one additional matching rule is applied after the second content is restricted from being displayed on the computing device; and
provide, to the computing device, the deep link to cause the second content to be displayed via the second application.

17. The non-transitory computer-readable storage medium of claim 16, wherein the instructions when executed cause the computing device to:
determine additional first content selected for display on the computing device;
determine, using a set of display-restrictive filters employing criteria based on at least one of a device, user, location, or content type, that additional second content, corresponding to the additional first content, is restricted from being displayed on the computing device via the second application; and
cause the additional first content to be displayed via a browser application, of the plurality of first applications, on the computing device.

18. The non-transitory computer-readable storage medium of claim 16, wherein the instructions when executed further cause the computing device to:
determine that the second application is not installed on the computing device; and
cause the computing device to redirect to a location from which the second application can be obtained.

19. The non-transitory computer-readable storage medium of claim 16, wherein the instructions when executed further cause the computing device to:
determine, based at least in part upon at least one of user preference data or user behavior data, to automatically redirect the computing device to display the second content via the second application; and
provide information regarding the redirect to the computing device with the link.

20. The non-transitory computer-readable storage medium of claim 16, wherein the instructions when executed further cause the computing device to:
compare information for the first content to an ordered set of the matching rules; determine an applicable matching rule from the set of matching rules, wherein the applicable matching rule is used to determine the second content; and analyze each filter of the set of display-restricting filters to determine, for the applicable matching rule, whether the second content is restricted from being displayed on the computing device.

* * * * *